US007088959B2

(12) United States Patent
Ho et al.

(10) Patent No.: US 7,088,959 B2
(45) Date of Patent: Aug. 8, 2006

(54) METHOD OF SELECTING MAXIMUM TRANSMISSION POWER LEVEL TO BE USED BY A RADIO TELECOMMUNICATIONS BASE STATION OR BASE STATIONS IN A NETWORK, A RADIO TELECOMMUNICATIONS BASE STATION AND RADIO TELECOMMUNICATIONS NETWORK

(75) Inventors: Lester Tse Wee Ho, London (GB); Jonathan Michael Pitts, London (GB); Louis Gwyn Samuel, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 488 days.

(21) Appl. No.: 10/382,403

(22) Filed: Mar. 6, 2003

(65) Prior Publication Data
US 2003/0171132 A1    Sep. 11, 2003

(30) Foreign Application Priority Data
Mar. 6, 2002    (GB) ............................ 0205282.7
Jun. 24, 2002    (EP) ............................ 02254380

(51) Int. Cl.
*H04B 1/00* (2006.01)
*H04B 7/00* (2006.01)
(52) U.S. Cl. .................. 455/69; 455/449; 455/524; 455/412.2

(58) Field of Classification Search .............. 455/69, 455/522, 63.2, 450, 127.1, 127.2, 127.3, 455/127.4, 127.5, 13.4, 571, 572, 126, 70, 455/561, 68, 412.2, 422.1, 423, 424, 443, 455/449, 446, 524, 525, 67.11
See application file for complete search history.

(56) References Cited
U.S. PATENT DOCUMENTS

| | | | | |
|---|---|---|---|---|
| 5,842,114 | A | * 11/1998 | Ozluturk | ....................... 455/69 |
| 6,181,918 | B1 | * 1/2001 | Benveniste | ................. 455/63.2 |
| 6,718,180 | B1 | * 4/2004 | Lundh et al. | ................ 455/522 |
| 6,925,310 | B1 | * 8/2005 | Ishikawa | ..................... 455/522 |

OTHER PUBLICATIONS

Huang, X. et al., "Automatic Base Station Placement and Dimensioning for Mobile Network Planning", Vehicular Technology Conference, 2000, IEEE VTS Fall VTC 2000, 52$^{nd}$ vol. 4, pp. 1544-1549.

* cited by examiner

*Primary Examiner*—Edward F. Urban
*Assistant Examiner*—John J. Lee (57) ABSTRACT

A maximum transmission power level to be used by a radio telecommunications base station in communicating with a mobile user terminal is selected. The base station communicates with neighboring base stations to determine distances to the neighboring base stations, and sets the maximum transmission power level at a level such as to enable communications with mobile user terminals located at most a fraction of the distance from the base station towards the nearest neighboring base station.

9 Claims, 11 Drawing Sheets

Fig. 4 Cell boundaries without correction

Fig. 5 Cell boundaries with correction

Fig. 8a
Cell boundaries before addition of base station

Fig. 8b
Cell boundaries after first base station is added

Fig. 8c
Cell boundaries after second base station is added

Fig. 9a Network configuration before UE feedback stage

Fig. 9b Network configuration after UE feedback stage

METHOD OF SELECTING MAXIMUM TRANSMISSION POWER LEVEL TO BE USED BY A RADIO TELECOMMUNICATIONS BASE STATION OR BASE STATIONS IN A NETWORK, A RADIO TELECOMMUNICATIONS BASE STATION AND RADIO TELECOMMUNICATIONS NETWORK

CROSS REFERENCE TO RELATED APPLICATION

This application claims priority of European Application No. 02254380.5, filed Jun. 24, 2002, and also Great Britain Provisional Application No. 0205282.7, filed Mar. 6, 2002.

1. Technical Field

The present invention relates to selecting a maximum transmission power level to be used by a radio telecommunications base station in communicating with a mobile user terminal; selecting a maximum transmission power level to be used by a radio telecommunications base stations in a network; a radio telecommunications base station; and a radio telecommunications network 2. Background of the Invention The process of designing and deploying cellular networks can be a tedious one. The positions of the base stations and the power settings for each base station have to be selected carefully. Nowadays, it is a network planner's task to manually choose the parameters of the base stations by making a survey of the site to determine appropriate placements and propagation characteristics of the base stations. This manual approach is often time consuming and involves a labor intensive series of tasks. Obtaining the measurements and data needed for planning the placement and settings of the base stations requires substantial investment in labor, time and monetary resources. These problems are further compounded by the trend of wireless networks towards wireless LAN type high bit-rate transmissions, which generally require relatively small cell sizes, and hence, a larger amount of base stations to cover an area.

Known cell dimensioning processes usually involves the use of propagation models or measurements that are made on site in order to calculate the position and power settings for the base stations. The final configuration is then either tested using simulation software, or set up without simulation testing. If the resulting configuration is not satisfactory, then the process is repeated again until an acceptable configuration is found.

Work to automate the process described above by defining a best placement strategy has been undertaken as described by Huang X., Behr U., Wiesbeck W, "Automatic base station placement and dimensioning for mobile network planning" Vehicular Technology Conference, 2000. IEEE VTS Fall VTC 2000. 52nd, vol. 4, pp.544–1549, where the locations for the base stations are calculated based on the environment of the site. However, such automated base station placement methods also have to be done "off-line" with surveying of the site still being necessary.

SUMMARY OF THE INVENTION

An embodiment of the present invention provides a method of selecting a maximum transmission power level to be used by a radio telecommunications base station in communicating with a mobile user terminal. The method comprises a base station communicating with neighboring base stations to determine distances to the neighboring base stations, and setting the maximum transmission power level at a level such as to enable communications with mobile user terminals located at most a fraction of the distance from the base station towards the nearest neighboring base station.

Preferred embodiments include each base station in a cellular network including an algorithm for automatic cell sizing. Self-organization is becoming an increasingly important aspect in cellular networks, and preferred embodiments provide a highly distributed, flexible, and cost-effective, automated approach to cell sizing in cellular networks. This is particularly advantageous in so-called Third Generation and future generation networks.

The present invention in its preferred embodiments provides a simple rule-based distributed algorithm, and enables automated cell sizing during initial deployment, and also during addition and removal of base stations in a network. The decision making burden is placed on the base stations. Control is thus distributed and local, and network scalability is enhanced. Accordingly, decisions are made without explicit global representations of the whole network.

The present invention in its preferred embodiments provides an automated algorithm distributed among the base stations that enables the base stations to adjust their cell sizes independently and automatically. The present invention in its preferred embodiments provides distributed and auto-configuring cell dimensioning during network deployment without need for extensive prior planning and surveying of the site. Automatic readjustment of cell size during addition and removal of base stations is also provided.

The present invention has an advantage of robustness, because control is totally distributed, the method works even if other base station fails. Any changes needed due to base station failures are undertaken automatically. The present invention has an advantage of flexibility; adding or removing base stations can be done with the base stations adjusting their cell sizes to take into account the changes made. The present invention has an advantage of scalability, the method is able to support a very large network. Theoretically, there is no limit to the size of the network for which the method would work.

On a further point, developments in so-called Third Generation 3G networks (in accordance with Third Generation Partnership Project 3GPP specifications) such as Universal Mobile Telecommunications System UMTS networks placw increasing emphasis on high data rate transmission and interoperability with other platforms such as Bluetooth, HIPERLAN and IEEE 802.11. Accordingly there is a need for cheap, small, easily set up and ubiquitous base stations. These types of base stations would require auto-configuring capabilities as provided by the present invention.

Preferably the fraction of the distance from the base station towards the nearest neighboring base station is just over half.

Preferably the base station communicates with the neighboring base stations by sending a message at a predetermined time, those of the neighboring base stations which successfully receive the message responding with a response indicating the time of successful receipt of the message, distance (s) being determined dependent upon the differences between receipt time(s) and the predetermined time. Preferably a series of messages are sent with successively incremented power levels.

Furthermore preferably each message includes an identifier of the base station, and each response including an identifier of the responding neighboring base station.

Furthermore preferably at least one of the neighboring base stations communicates with the base station by sending a value dependent upon its already determined distance to the base station.

Furthermore preferably if the distance to the nearest neighboring base station is less than a predetermined amount, the base station shuts down.

Preferably the maximum transmission power level once selected is notified to the neighboring base stations, so that where a gap in coverage between the base station and a neighbor occurs, the maximum transmission power level of a neighbor is increased so as to cause the cell associated with that neighbor to overlap with the cell of the base station.

Preferably after the maximum transmission power level once selected is not reselectable for a predetermined time.

Preferably the method of selecting maximum transmission power level is re-executed by the base station upon any of the neighboring base stations performing a method of selecting maximum transmission power level.

Preferably upon detection of call connections being dropped due to mobile user terminals entering a gap in cell coverage, the maximum transmission power level is increased so as to reduce or close the gap. Preferably the maximum transmission power level is adjusted such that the cell size is increased by a predetermined factor $F=ne^{-2d}$ where n is the number of mobile user terminals to which call connections with the base station were dropped, and d is the increase in cell size radius to be applied.

Furthermore an embodiment of the present invention also provides a method of selecting a maximum transmission power level to be used by radio telecommunications base stations in a network in communicating with mobile user terminals. The method comprises each base station communicating with neighboring base stations to determine distances to the neighboring base stations, and setting its maximum transmission power level at a level such as to enable communications with mobile user terminals located at most a fraction of the distance towards its nearest neighboring base station.

The present invention also provides a radio telecommunications base station operative to select a maximum transmission power level to be used in communicating with a mobile user terminal, the base station being operative to communicate with neighboring base stations to determine distances to the neighboring base stations and to set the maximum transmission power level at a level such as to enable communications with mobile user terminals located at most a fraction of the distance from the base station towards the nearest neighboring base station.

The present invention also provides a radio telecommunications network comprising base stations, each base station being operative to select a maximum transmission power level to be used in communicating with mobile user terminals, each base station communicating with neighboring base stations to determine distances to the neighboring base stations and setting its maximum transmission power level at a level such as to enable communications with mobile user terminals located at most a fraction of the distance towards its nearest neighboring base station.

DETAILED DESCRIPTION

The cell dimensioning algorithm was developed mainly to make the process of setting up the network as simple as possible from the point of view of the network provider. The provider basically only has to (1) erect a base station and make the appropriate electrical connections before powering up, (2) place another base station at a roughly estimated minimum distance from other base stations, (3) repeat the process throughout the area intended for coverage. The task of determining the transmit power of the base station and to a certain extent, the positioning of the base station are basically removed from the network provider. The algorithm is particularly intended for use in a microcell or picocell environment where the sizes of the cells are fairly small.

Basically speaking a two stage approach is undertaken. The first stage deals with finding the neighbors and calculating the cell size of a base station. The first stage works by making the base station incrementally increase its cell size and polling and gathering information on any neighbors within its range and determining its distance from the neighbors.

The second stage (post deployment optimization) fine tunes the configuration to obtain maximum coverage to minimize gaps in coverage. The second stage is implemented once the first stage is completed. Here, the base station monitors the mobiles that are connected to it, and increases its cell size based on how many mobiles are dropped due to gaps in the coverage.

The Algorithm

In the cell dimensioning algorithm, the base station is considered as an automaton that has three possible states, S, denoted as $S=\{A,I,C\}$ where A is the "active" (i.e. cell dimensioning possible but not occurring) state, I is the "inactive" (i.e. cell dimensioning not permitted) state and C is the "configuring" (i.e. cell dimensioning occurring) state.

Figure 1:
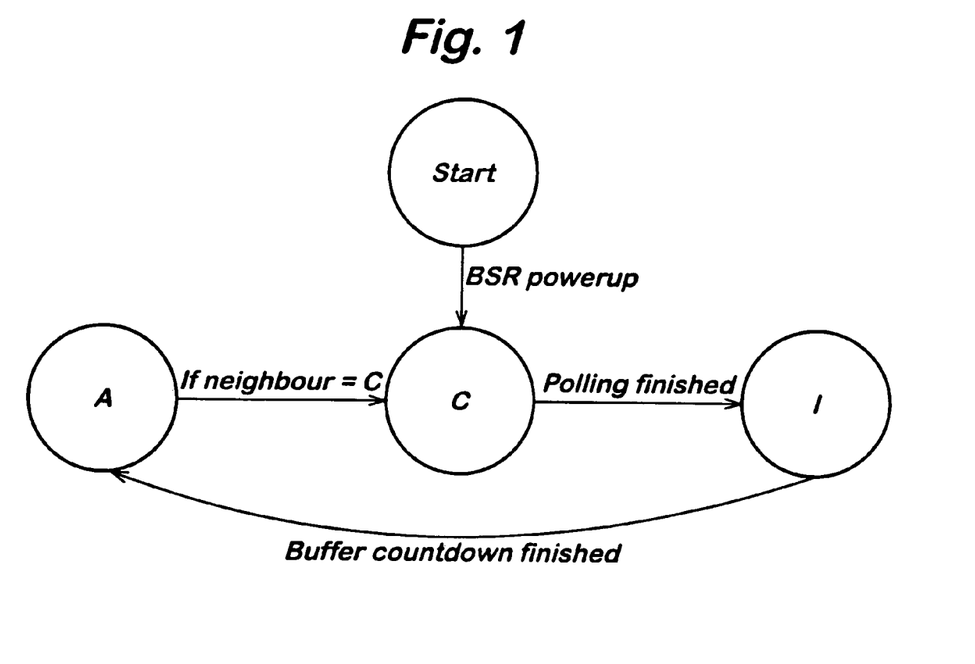
FIG. 1 is a diagram illustrating transitions between states of a base station using the preferred algorithm.

The state transition scenarios, which are illustrated in FIG. 1, are as follows: The base stations start out at state C upon power up. Upon completion of the configuration process, the base station enters the idle state I, where it basically becomes inactive and ignores the state of its neighbors for a set period of time (known as the backoff time). Once the period is over, the base station goes into active state A. The base station will remain at active state A until one of its neighbors is in configuring state C, upon which it will enter into configuring state C as well.

The effect of using this set of rules results in a behavior where there will be a propagation of configuring state C whenever a change to the network is made. It can thus be considered that all the base stations in the network would be nudged to refresh their respective cell size whenever a change to the network is made.

Figure 2A:
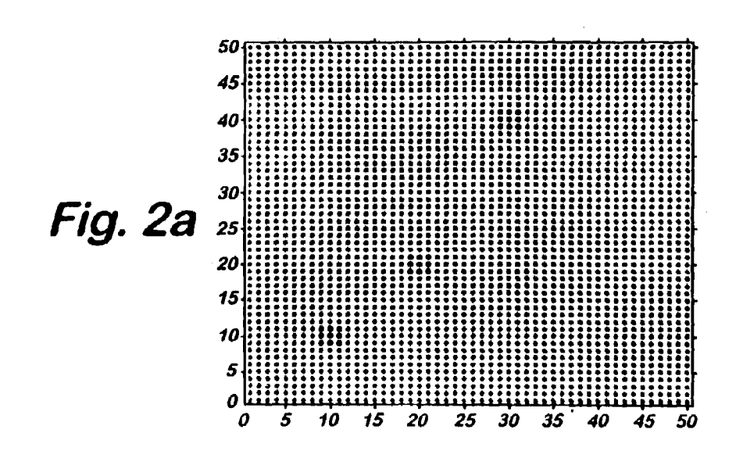
FIG. 2 is a diagram illustrating time evolution (clockwise from upper left, denoted a to c) of a network of base stations using the algorithm's state transition rules.
Figure 2B:
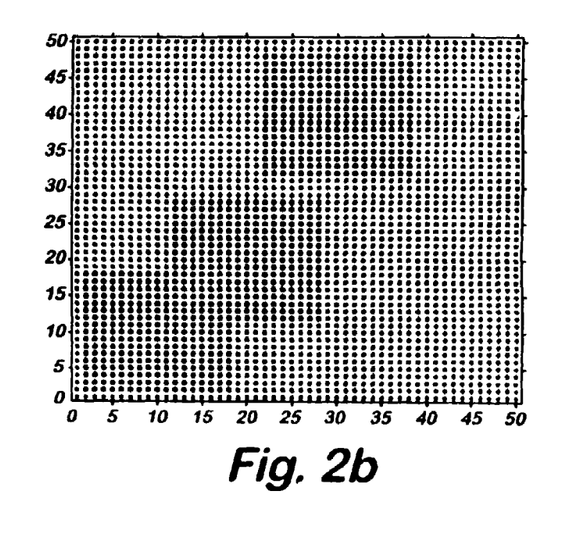
Figure 2C:
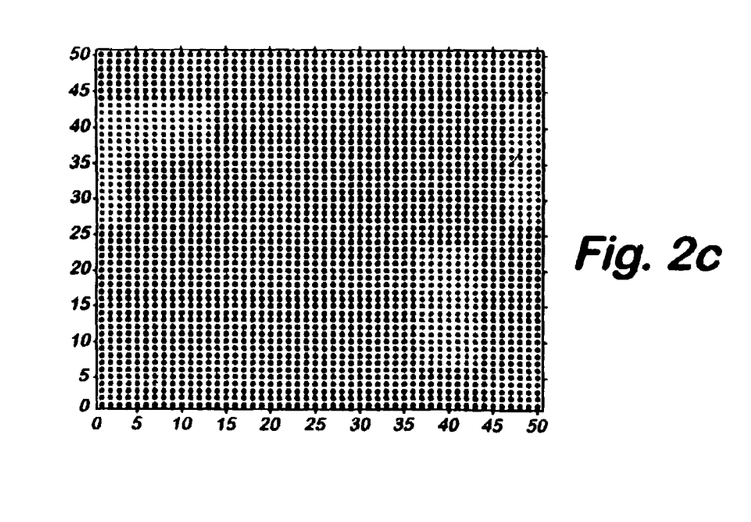

Applying the above state transition rules to a two-dimensional network of base stations, the effect is shown in FIG. 2. FIG. 2 illustrates how a network of base stations evolves over time (clockwise from upper left, denoted a to c) using the algorithm's state transition rules mentioned above. In FIG. 2, dark regions show configured base stations (state I), light regions unconfigured base stations (states A,C), the starting point base stations having been chosen at random.

Description of the Configuring State

Figure 3A:
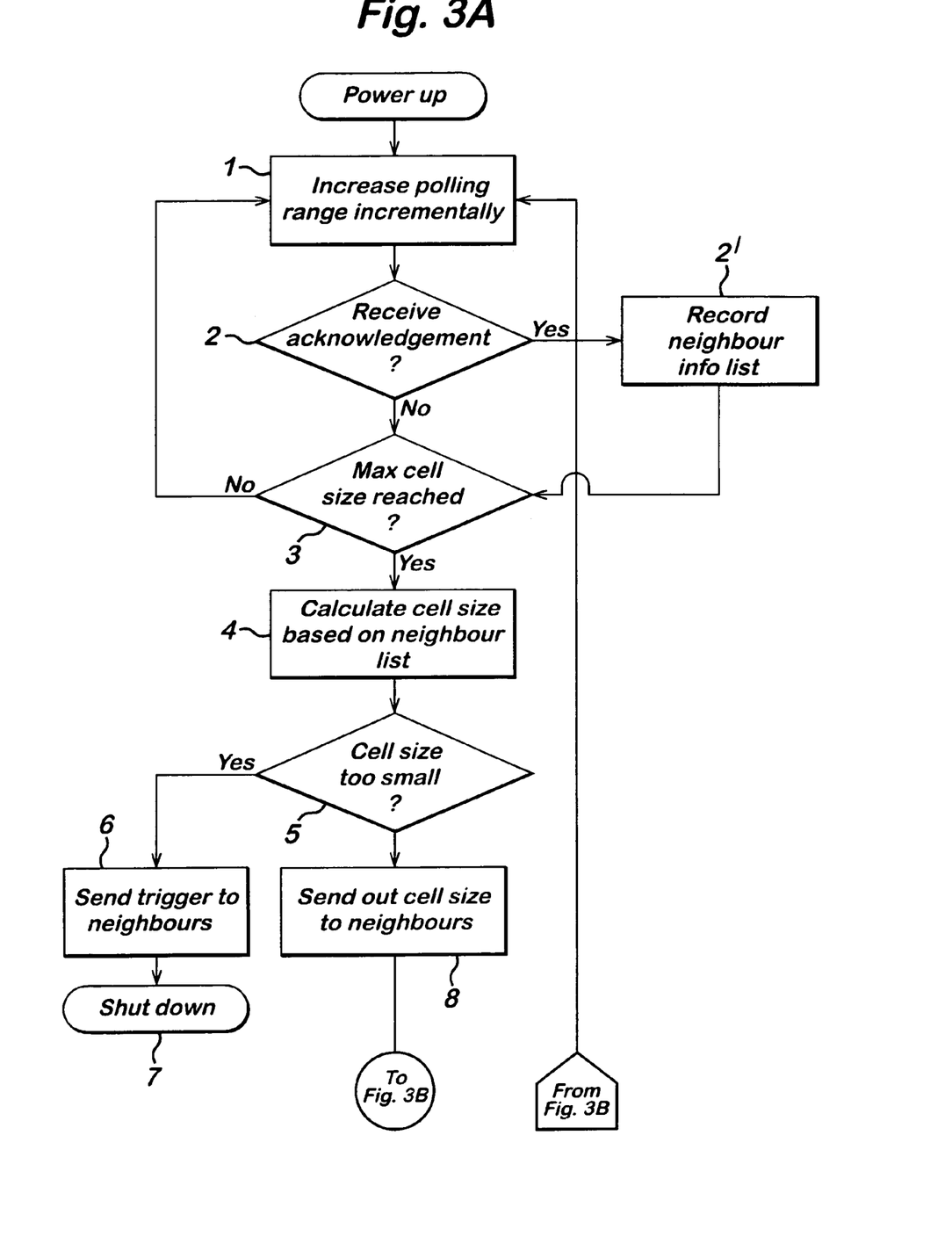
FIGS. 3A and 3B when placed together are a flowchart showing the configuration process.
Figure 3B:
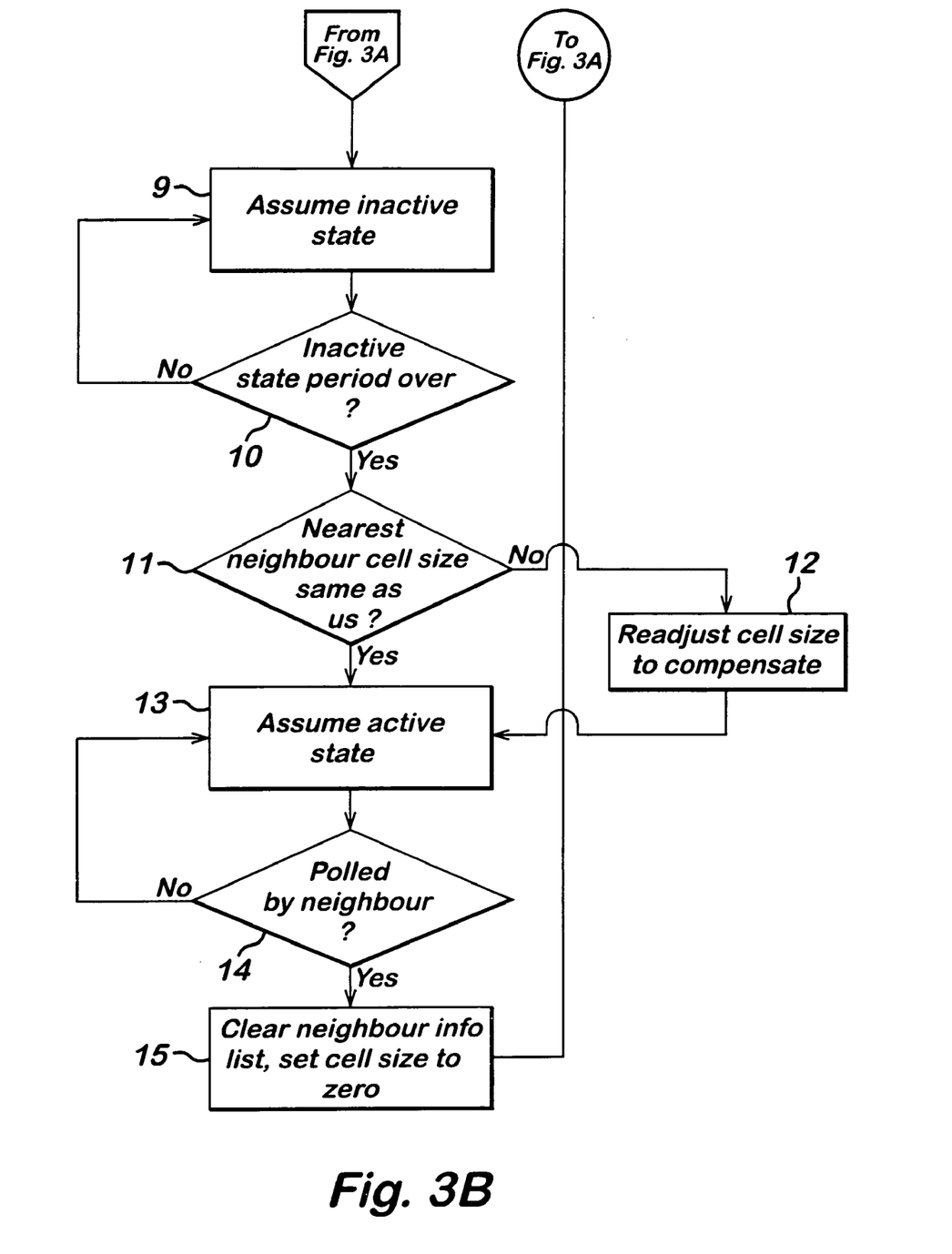

As shown in FIGS. 3A and 3B, the algorithm involves gathering information of approximate positions of neighbors to a base station so as to determine transmit power from the base station. This step is executed during state C, the configuring state. Each base station creates a list containing the distances of all its neighbors (i.e. the base stations within its maximum range). It creates the list in two ways: by polling its neighbors and by receiving information sent by its neighbors.

The process of polling neighbors involves the base station (in the contacting cell) gradually increasing its transmit power (step 1 as shown in FIG. 3A) so that its cell size expands to its maximum cell size (3). The signal transmitted during this state contains timing information and the identification of the cell. Its neighbors (i.e the base stations in the contacted cells) detect the presence of the signal and send out a response to the contacting cell (2). Each response signal basically contains its source cell identification and the time in which that neighboring base station received the contacting cell's signal. The base station in the contacting cell thus collects information (2') about the neighboring base stations located within its range, and based on the time at which each of those base stations was contacted, an approximation of the distance to each of those base stations are produced. Based on that information, the base station in the contacting cell then calculates (4) and determines its final transmit power (i.e its cell size) based on the information contained in the compiled list of distances. The rule used is such that cell radius is selected to be just over half the distance to the nearest neighboring base station.

The base station also checks (5) if its neighbor has been placed too close to itself. If it has, then the base station will wait for a period of time before shutting down (7) and sending (6) a message to its neighbors to clear their list of neighbors and begin the polling process again (i.e. nudging the neighbors into configuring state C). This feature was included due to the assumption that the placement of the base stations is done in a relatively unplanned manner and hence occurrences may occur of base stations that are too close to each other. More specifically during this shutting down mode (i.e when one base station shuts down), that base station will wait for a random amount of time before initiating the shutting down process. This involves the base station sending a reset message to all its neighbors. The reset signal triggers its neighbors, as mentioned above, to clear their lists of neighbors and go into polling mode. This is done so that the neighbors each begin compiling a new list without the shutting down base station being taken into consideration. Once the reset signal is sent out, the shutting down base station powers down and stops transmitting, effectively removing itself from the network.

Figure 4:
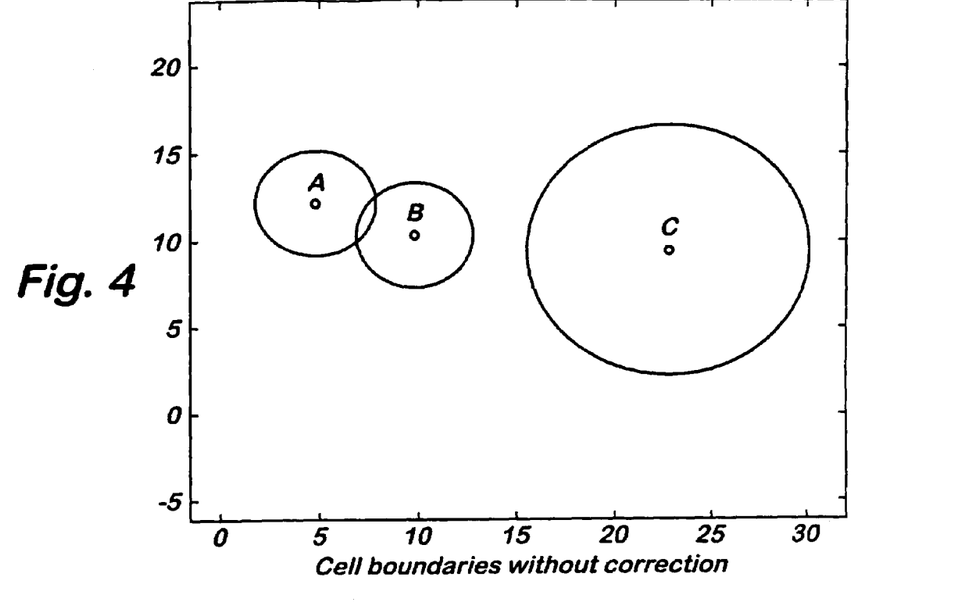
FIG. 4 is a result showing cell boundaries of a simulation without correction for gaps.
Figure 5:
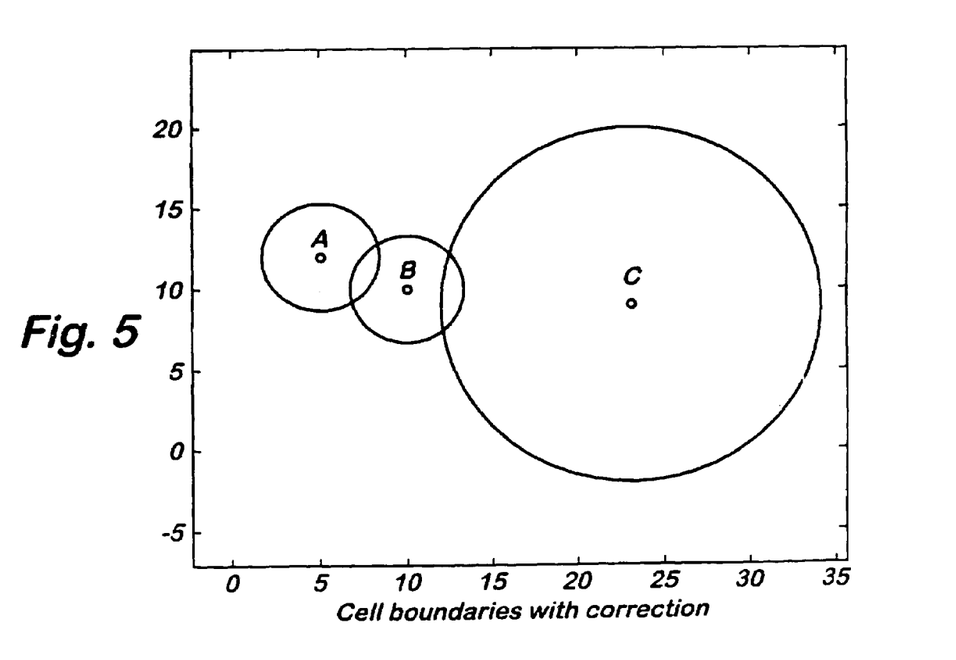
FIG. 5 is a result showing cell boundaries of a simulation with correction for gaps for comparison with FIG. 4.

This approach as described so far however, would only work if there were two cells involved. If more than two cells are taken into consideration, without a further step the result could be erroneous, as shown by way of example in FIG. 4. Accordingly, whenever a base station completes its configuring state C, it (8) sends out its final cell size to its neighbors then spends a period in the idle state I (9,10). Upon receiving this information, the neighbors update their information list and make the appropriate adjustments to their cell sizes, specifically each base station (11,12) compensates for where its cell size based on its distance from its nearest neighbor is different from the cell size of its nearest neighbor because that nearest neighbor sets its own cell size dependent upon another base station even closer to that neighbor. With this step in place, an example resulting configuration is shown in FIG. 5 for comparison with FIG. 4.

The base station then enters its active state A (13) until polled by its neighbor (14) whereupon it resets its cell size to zero and clears its neighbor list in entering configuring state C, and returns to step 1 above.

Good coverage overall depends on the placement of the base stations. Gaps in the coverage may appear where if one base station were to increase its cell size to cover up the gap it would unacceptably interfere with its neighbor. To avoid this from happening, a guideline is employed when placing the base stations (e.g."place base stations at least 50 m apart"). Placing groups of base stations closely together in clusters would result in inadequate coverage where small clusters of coverage occur with large gaps in between. In order to minimize this effect, each base station is made to check its cell size to make sure that it is not placed too close to another cell. A base station that is located too closely to its neighbor will activate its shutdown sequence as mentioned above.

Calculating the Distances Between Neighbors

When a base station is polling its neighbors, it keeps track of its transmit power and at what time it transmits at that power level. The polling signal that it broadcasts contains information about the base station's identification and the timing information. When a neighbor first detects this signal, it sends out a reply signal containing the timing information that it has received from the polling signal. The polling base station, upon receiving the reply, looks up what power level the transmit signal had to reach the neighbor, and thus estimates the distance between them.

Simulation Results

A simulation program was written to assess the performance of the algorithm. In the simulations, the base stations are powered up at different times, in a random sequence. In the simulations, backoff time, i.e time for which a base station is in the idle state shown in FIG. 1, was set to be 300 iterations, and a cell size change increment of 0.1 m per iteration was selected.

Once a simulation is started, there is a setting up period where all the base stations begin collecting and broadcasting information, before all the cell sizes settle down to a stable configuration.

Figure 6:
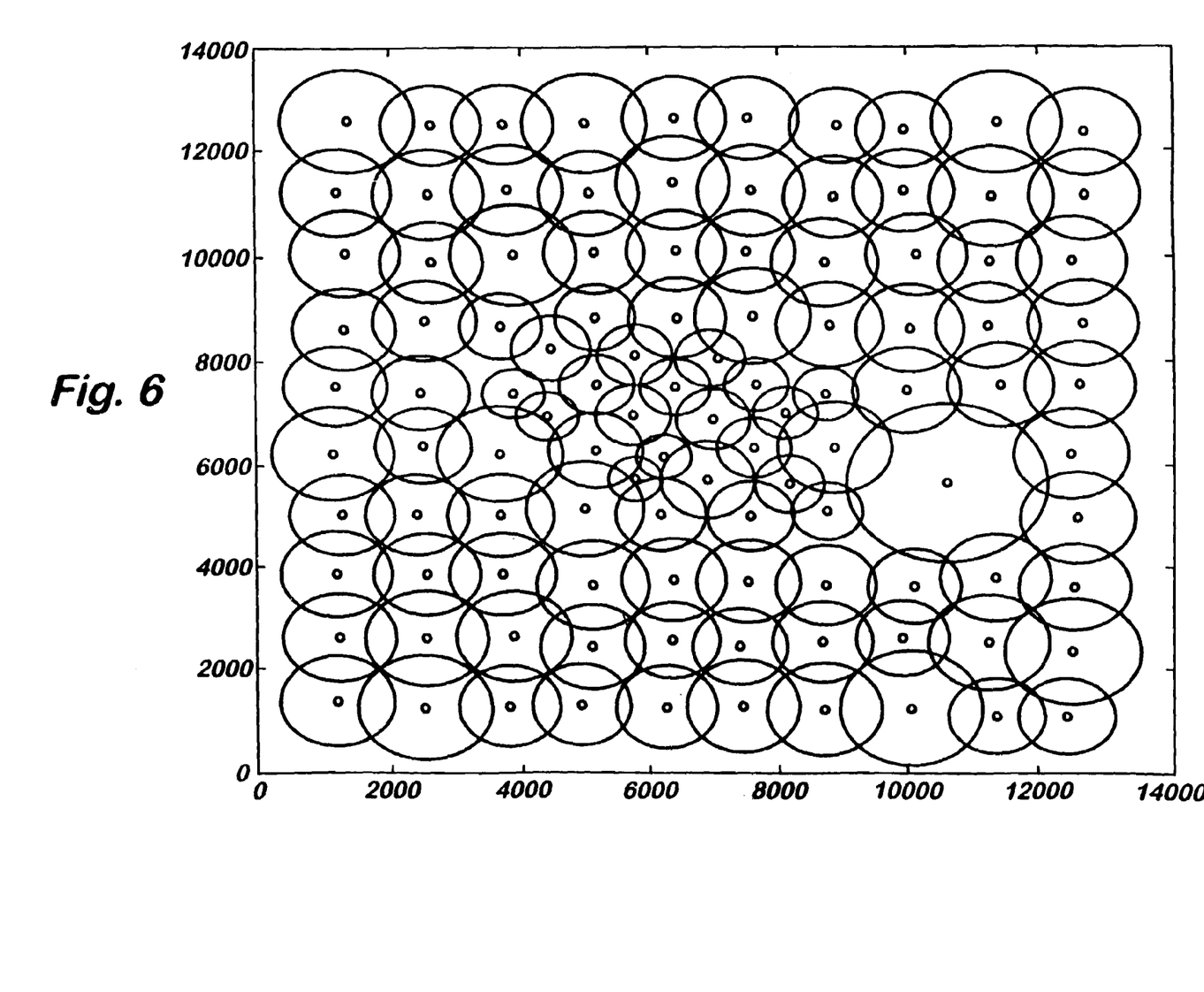
FIG. 6 is a resulting configuration of a simulated network with base stations placed with various densities.

In a first simulation, the base stations were considered to be laid out over an area that has a size of 10 km by 10 km. The base stations were considered to be laid out in a fairly uniform grid pattern, but with different densities in certain areas (base stations are closer to each other in some areas and further away in other areas). The base stations are laid out according to a grid, placing them 1200 m apart, but with a maximum deviation of ±5 m in the x and y axes (or in a square an area of 100 m². This grid arrangement is to reflect a placement procedure where the base stations are placed at reasonable spacings apart, but with different densities. The results of this first simulation are shown in FIG. 6. The results show that the algorithm is able to achieve coverage without causing too much interference. In other words, the handover boundaries of the cells do not encroach that of their neighbors by more than an acceptable amount.

Figure 7A:
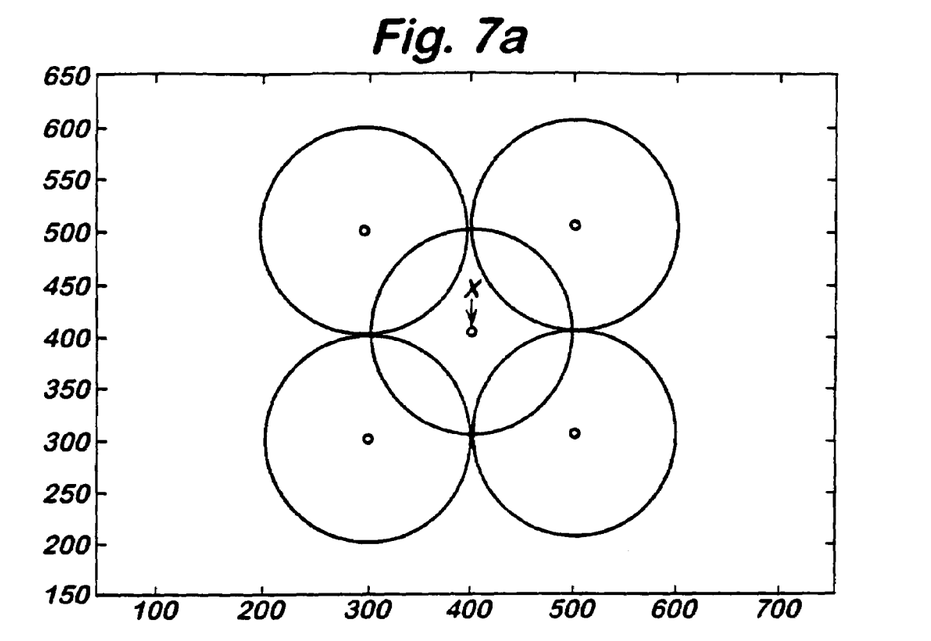
FIG. 7 comprises the results of simulations showing cell boundaries (a) before and (b) after a base station denoted X is removed.
Figure 7B:
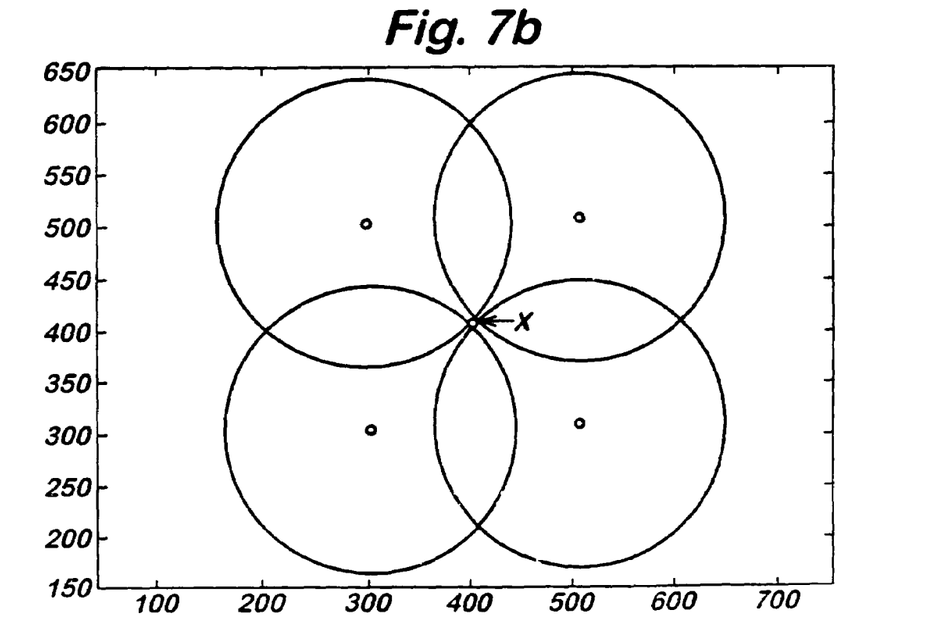

Another simulation was run with five base stations, placed in the arrangement show in FIG. 7a. The base stations are then powered up and their cell sizes allowed to settle down before the base station in the middle (labelled X) was shut down. When shutting down, base station X sent out a reset signal to its neighbors, prompting them to empty their neighbors list and enter into the polling mode. FIG. 7b shows the final configuration of the remaining four base stations. These results show the alogrithm's ability to make changes to compensate when a base station is removed from the network.

Figure 8A:
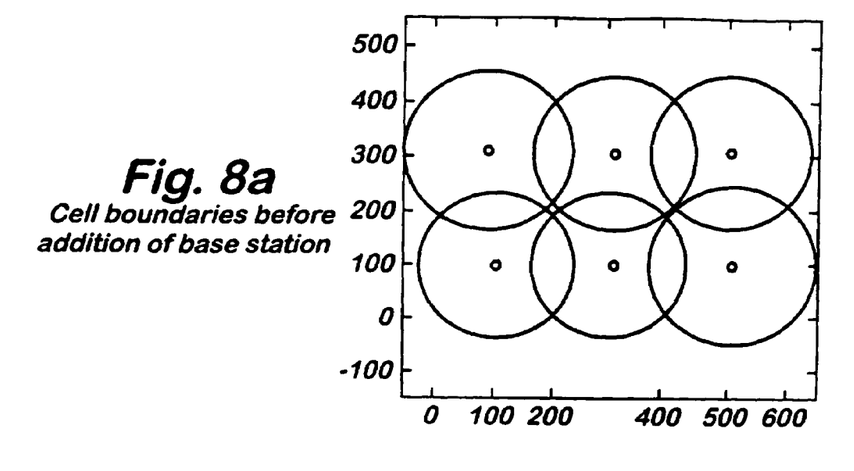
FIG. 8 comprises the results of simulations showing cell boundaries (a) before addition of a base station, (b) after addition of a base station, and after addition of a second base station.
Figure 8B:
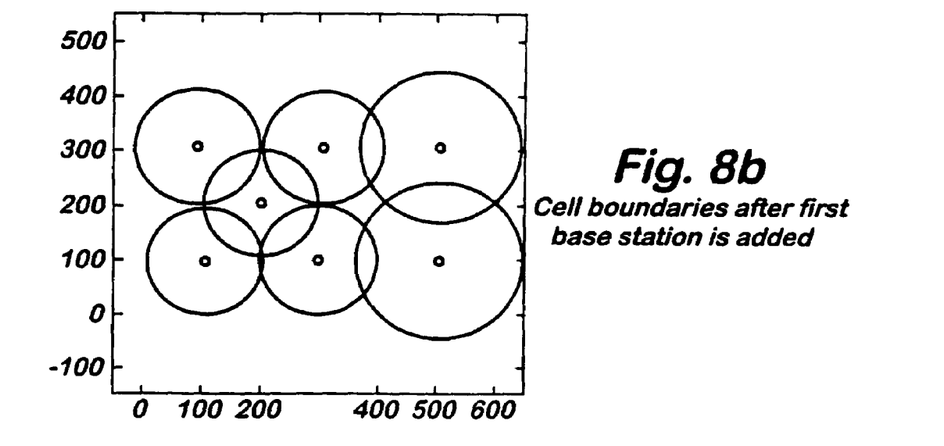
Figure 8C:
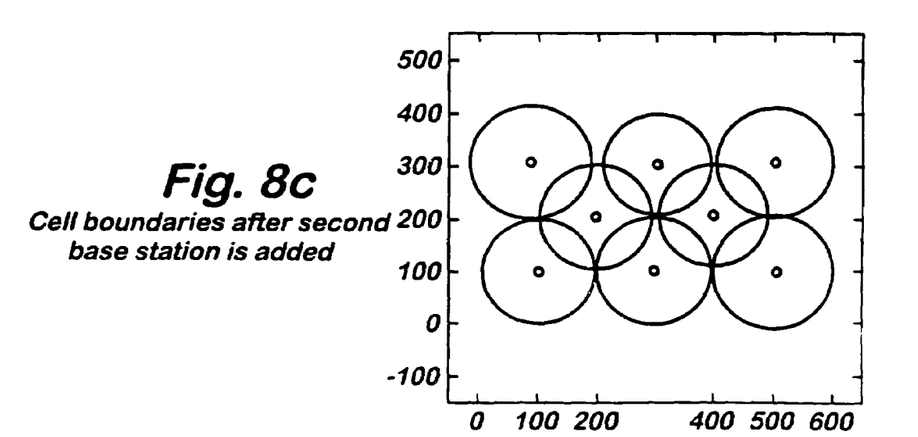

FIG. 8 shows the result of a further simulation where base stations are added to the initial existing network, which in this case, is made up of six base stations. The base stations are placed in a grid at approximately 200 m apart but with a random ±10 m deviation from the grid. Two base stations are added one after the other, at random times. In FIG. 8, (a) shows cell boundaries before addition of an extra base station, (b) shows the cell boundaries after a first base station was added, and (c) shows the cell boundaries after a second base station was added. The results show that the base stations are, upon each of the new base stations being added in, in each case able to find the correct cell sizes solution.

Post-Deployment Optimization

In this auto-configuration process as described so far, gaps can occur in the coverage. Perfect coverage is achievable if the placement of the base stations is optimal, but this scenario is not possible in real life. Besides that, an advantage of the auto-configuration of cell sizes is to make the installation of the network as simple as possible, which would mean starting with non-optimal base station placements.

Accordingly a second stage in the sizing of cells is added in to avoid having gaps. This stage involves feedback from the mobile user terminals (also each called User Equipment (UE)) in order to detect the presence of gaps in coverage.

During this second stage, the base stations each keep track of the mobile user terminals that are call-connected to it. When a call-connection between a base station and a mobile user terminal call-connected to it is dropped (i.e. disconnects without a handover), then that base station increases its cell size by an increment. The base station checks after a fixed period of time the status of the mobile user terminals in its cell, and increases its cell size depending on how many mobiles have been dropped during that period. The amount the cell size is increased by a factor of F where $$F = ne^{-2d}$$

where n is the number of mobile user terminals that were dropped from the base station, and d is the difference between the current cell size and the cell size that was established during the first stage. This is to make sure that any one base station does not increase its cell size too much and so distributes the process among all the other base stations in the network, so that not only one base station increases its cell size to cover up a gap, but also its surrounding neighbors.

Figure 9A:
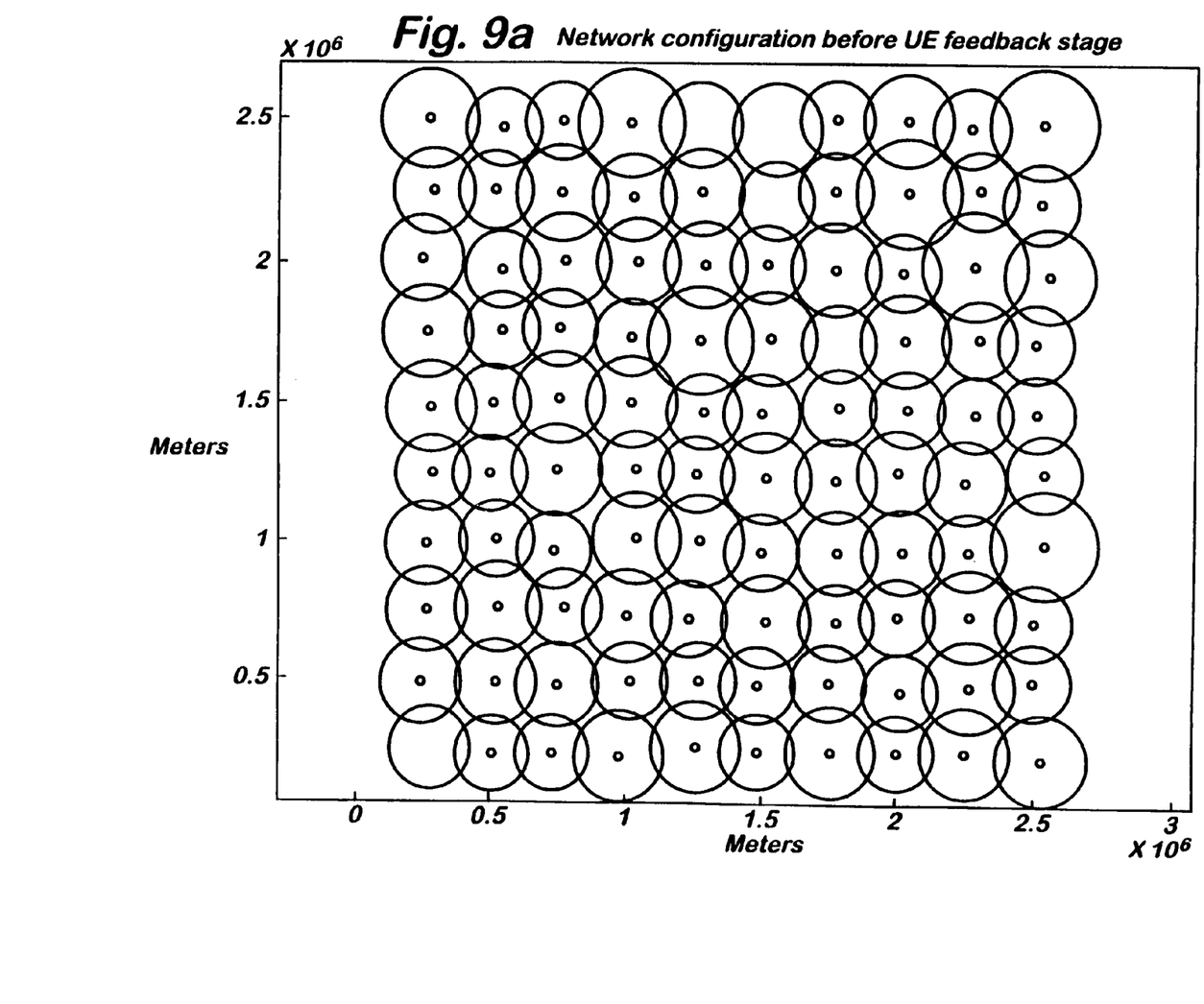
FIG. 9 is a simulated network configuration (a) before and (b) after mobile user terminal feedback to minimize gaps.
Figure 9B:
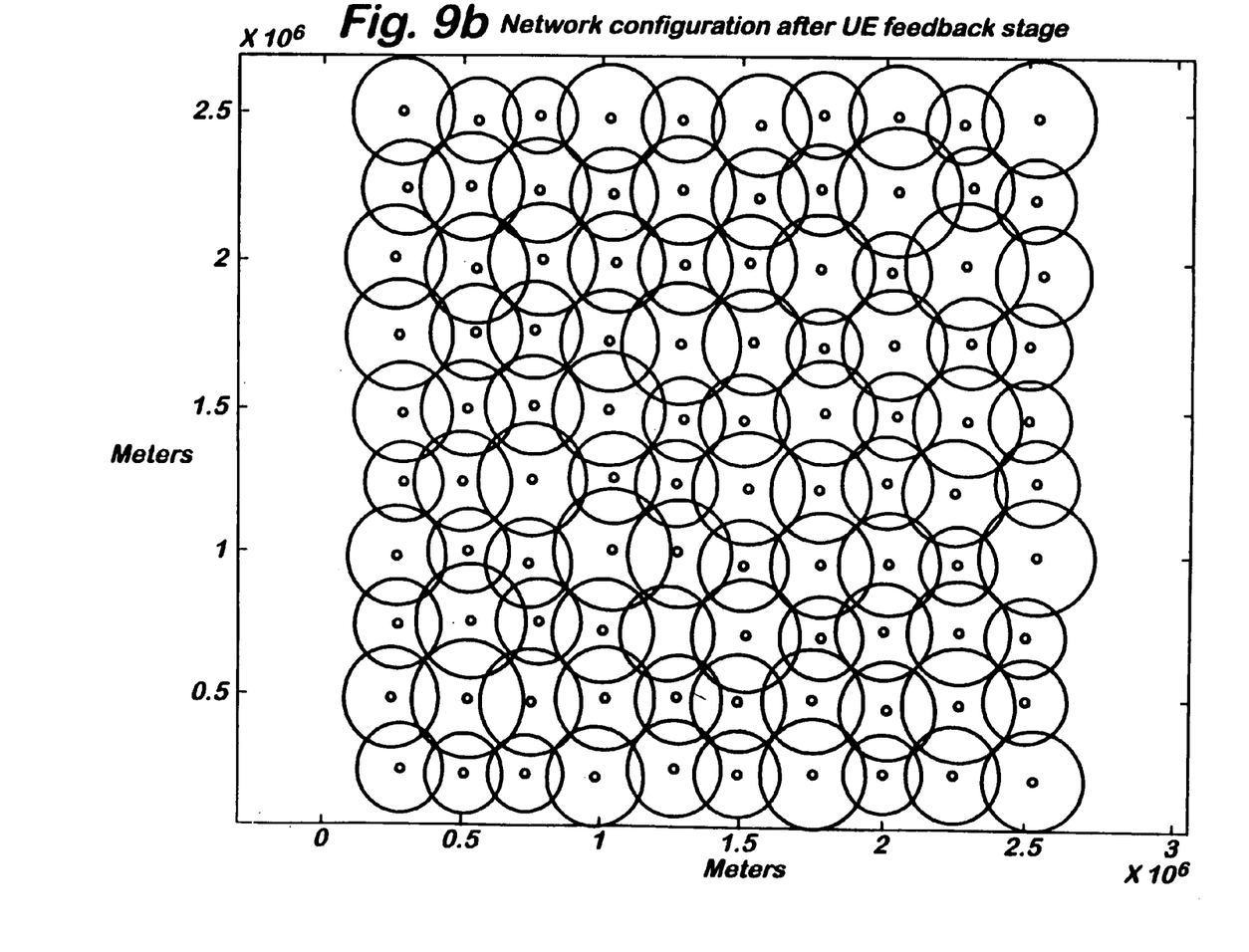
Figure 10:
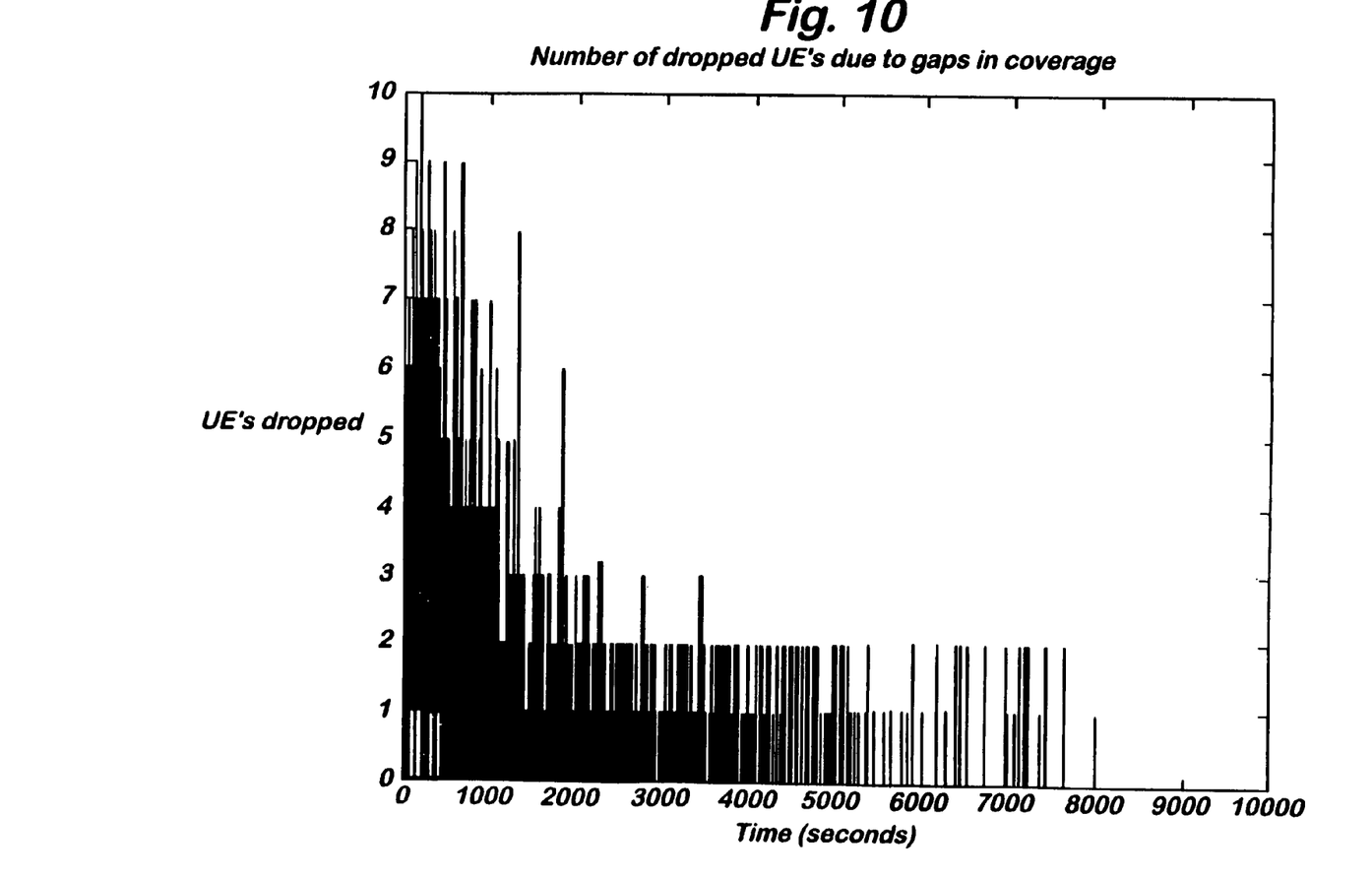
FIG. 10 is a graph showing the consequential reducing rate at which mobile user terminals are dropped over time due to gaps in coverage (simulated data)

The process was simulated in a network with 100 base stations, placed in a loose grid with a ±250 metres deviation from the ideal grid location points. This placement is to reflect a placement procedure that didn't require extensive planning beforehand. The first stage of the cell dimensioning method resulted in a configuration shown in FIG. 9a, where it can be seen that gaps in coverage exist. 500 mobile user terminals were then placed randomly in the network, each moving with a mean velocity of 5 metres per second, sending back reports to the base station every second. The simulation was run for 10,000 seconds. The configuration obtained after the mobile user terminal feedback is shown in FIG. 9b. It will be seen that the gaps in the coverage were eventually covered up, and, as shown in FIG. 10, the number of mobile user terminals that are dropped due to lack of coverage is reduced to zero.

General

To summarize, a method has been presented of auto-configuration of wireless networks by using a distributed algorithm for cell dimensioning. The algorithm for the initial cell dimensions has a self-coordinating behavior, which is broadly analogous to the self-organizing behavior found in cellular automata. Besides self-organization, the algorithm is able to provide advantages such as scalability, flexibility and simplicity.

A second stage was added to complement the first stage by "fine-tuning" the cell sizes so as to cover gaps arising from less than ideal base station placements. Combining these two stages provides good coverage, with little or no call dropping.

The algorithm has been described as applicable to base stations scattered on a two-dimensional plane and so the simulations were run assuming such a two-dimensional distribution. However, it is also possible for the algorithm to function within a 3 dimensional environment, for example including the effect of base stations located in the floors above or below the coverage area in a network within a building. In that case, the base station may communicate to reach a base station located in the floor above or below it during the polling phase and the resulting cell size is adjusted so as to correspond with the cell located in the other floor.

The above-described embodiment is illustrative of the principles of the present invention. Other embodiments may be devised by those skilled in the art without departing from the spirit and scope of the present invention.

What is claimed is:

1. A method of selecting a maximum transmission power level to be used by a radio telecommunications base station in communicating with a mobile user terminal, the method comprising the base station communicating with neighbouring base stations to determine distances to the neighbouring base stations, and setting the maximum transmission power level at a level so as to enable communications with mobile user terminals located at most a fraction of the distance from the base station towards the nearest neighbouring base station, wherein the base station communicates with the neighbouring base stations by sending a message at a predetermined time, a neighbouring base station which successfully receives the message responding with a response indicating the time of successful receipt of the message, the distance to that neighboring base station being determined dependent upon the difference between the receipt time and the predetermined time.

2. The method according to claim 1, wherein the fraction is just over half.

3. The method according to claim 1, wherein a series of messages are sent with successively incremented power levels.

4. The method according to claim 1, wherein the maximum transmission power level once selected is notified to the neighbouring base stations, so that where a gap in coverage between the base station and a neighbour occurs, the maximum transmission power level of a neighbour is increased so as to cause the cell associated with that neighbour to overlap with the cell of the base station.

5. The method according to claim 1, wherein after the maximum transmission power level is once selected it is not reselectable for a predetermined time.

6. The method according to claim 1, wherein the method of selecting maximum transmission power level is re-executed by the base station upon any of the neighbouring base stations performing a method of selecting maximum transmission power level.

7. The method of claim 1, wherein upon detection of call connections being dropped due to mobile user terminals entering a gap in cell coverage, the maximum transmission power level is increased so as to reduce or close the gap.

8. A radio telecommunications base station operative to select a maximum transmission power level to be used in communicating with a mobile user terminal, the base station being operative to communicate with neighbouring base stations to determine distances to the neighbouring base stations and to set the maximum transmission power level at a level so to enable communications with mobile user terminals located at most a fraction of the distance from the base station towards the nearest neighbouring base station, wherein the base station is operative to communicate with the neighboring base stations by sending a message at a predetermined time, a neighboring base station which successfully receives the message being operative to respond with a response indicating the time of successful receipt of the message, the distance to that neighboring base station being deterimined dependent upon the difference between the receipt time and the predetermined time.

9. A method of selecting a maximum transmission power level to be used by a radio telecommunications base station in communicating with a mobile user terminal, the method comprising the base station communicating with neighboring base stations to determine distances to the neighboring base stations, and setting the maximum transmission power level at a level so as to enable communications with mobile user terminals located at most a fraction of the distance from the base station towards the nearest neighboring base station, wherein the maximum transmission power level once selected is notified to the neighboring base stations, so that where a gap in coverage between the base station and a neighbour occurs, the maximum transmission power level of a neighbour is increased so as to cause the cell associated with that neighbour to overlap with the cell of the base station.

* * * * *